US008687622B2

(12) United States Patent
McNair et al.

(10) Patent No.: US 8,687,622 B2
(45) Date of Patent: *Apr. 1, 2014

(54) SYSTEMS AND METHODS FOR DISCOVERING SCTP ASSOCIATIONS IN A NETWORK

(75) Inventors: Eric McNair, Wylie, TX (US); Jihao Zhong, Plano, TX (US); Kalpana C. Murthy, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/397,501

(22) Filed: Feb. 15, 2012

(65) Prior Publication Data

US 2012/0147776 A1    Jun. 14, 2012

Related U.S. Application Data

(63) Continuation of application No. 12/096,556, filed on Oct. 15, 2008, now Pat. No. 8,144,688.

(51) Int. Cl.
*H04L 12/28* (2006.01)

(52) U.S. Cl.
USPC ........... 370/351; 370/252; 370/392; 370/389; 370/231; 709/238; 709/203

(58) Field of Classification Search
USPC .......................... 370/252, 351, 231, 392, 389
See application file for complete search history.

(56) References Cited

U.S. PATENT DOCUMENTS

| 7,277,954 | B1* | 10/2007 | Stewart et al. | 709/230 |
| 2005/0157726 | A1* | 7/2005 | Vesterinen | 370/395.5 |
| 2005/0165885 | A1* | 7/2005 | Wong | 709/201 |
| 2006/0018301 | A1* | 1/2006 | Schrufer | 370/351 |
| 2006/0164974 | A1* | 7/2006 | Ramalho et al. | 370/219 |

OTHER PUBLICATIONS

Tuomas Aura et al., "Effects of Mobility and Multihoming on TRansport-Protocol Security", Proceedings of teh 2004 IEEE Symposium on Security and Privacy.*

* cited by examiner

*Primary Examiner* — Rasheed Gidado
(74) *Attorney, Agent, or Firm* — Edwards Wildman Palmer LLP; Scott D. Wofsy; George N. Chaclas

(57) ABSTRACT

Systems and methods for discovering SCTP associations between devices communicating in a network are described. A method comprises monitoring packets communicated among a plurality of source and destination devices, determining a combination of source EP address, source port number, destination IP address, and destination port number that defines an association between a source device and a destination device, and resolving a combination of source and destination verification tags that further defines the association based upon the combination of EP addresses and port numbers. The method further comprises ascertaining whether a subsequently monitored packet belongs to the association based at least in part upon an element of the combination of verification tags after at least one element of the combination of EP addresses and port numbers has changed during the ongoing communication.

27 Claims, 5 Drawing Sheets

SYSTEMS AND METHODS FOR DISCOVERING SCTP ASSOCIATIONS IN A NETWORK

CROSS-REFERENCE TO RELATED APPLICATIONS

This application is a Continuation of U.S. patent application Ser. No. 12/096,556 filed on Jun. 6, 2008, entitled "SYSTEM AND METHOD FOR DISCOVERING SCTP ASSOCIATIONS IN A NETWORK," which claims priority benefit to U.S. Provisional Application Ser. No. 60/748,103, entitled "ALGORITHM FOR DISCOVERY OF MULTI-HOMED SCTP ASSOCIATIONS IN A MONITORED NETWORK," filed Dec. 7, 2005, the disclosures of which are hereby incorporated by reference herein.

TECHNICAL FIELD

The present invention relates, in general, to network monitoring, and, more particularly, to the discovery of SCTP associations in a network.

BACKGROUND OF THE INVENTION

The Internet Protocol (IP) suite, also referred to as the TCP/IP protocol suite, is a group of communication protocols upon which computer networks run. The IP suite can be viewed as a set of layers, where each layer provides services to upper layers based on services received from lower layers. Specifically, the IP suite comprises an application layer, a transport layer, a network layer, a link layer, and a physical layer. As such, the transport layer responds to requests from the application layer, and issues requests to the network layer.

The Stream Control Transmission Protocol (SCTP) is one type of transport layer protocol defined by the Internet Engineering Task Force (IETF). It ensures reliable, in-sequence transport of messages with congestion control. One of the advantages of SCTP over other transport protocols is that SCTP is capable of transporting message streams, as opposed to byte streams. Another advantage of SCTP is that it provides multihoming support. Multihoming is a technique utilized to increase the reliability of a network connection, where at least one endpoint of the connection or association has more than one IP address.

The inventors hereof have recognized disadvantages inherent to SCTP and other multihoming protocols. For instance, when monitoring traffic in an IP network, correlating SCTP packets to their proper association (i.e., the combination of source and destination devices in communication over the network) can be very difficult after the initial setup of the association has already occurred. This is due to the fact that SCTP traffic related to an SCTP association may utilize multiple IP addresses over the life of the association.

BRIEF SUMMARY OF THE INVENTION

Embodiments of the present invention are directed to systems and methods for discovering associations in a network. In one embodiment, a method comprises monitoring packets communicated among a plurality of source and destination devices and determining a combination of source IP address, source port number, destination IP address, and destination port number that denies the association between a particular source and a destination device. After the combination of IP addresses and port number has been determined, verification tags belonging to the source and destination devices are resolved.

In one embodiment, once the source and destination verification tags are resolved, a method may ascertain whether a subsequently monitored packet belongs to the association based upon a combination of source IP address, source port number, destination verification tag, and destination port number. In another embodiment, the method may ascertain whether the subsequently monitored packet belongs to the association based upon a combination of source verification tag, source port number, destination verification tag, and destination port number. Alternatively or additionally, the method may make this determination based upon a combination of source port number, destination verification tag, and destination port number.

As such, the systems and methods described herein allow a network monitoring system to keep track of an association even as the source and/or destination IP addresses change during the life of the association. One of the many advantages of the present invention is that it allows the monitoring and measurement of a communication link that uses a protocol having multihoming features. Another advantage of the present invention is that the association may be monitored even after its original set up has already occurred—i.e., packets related to the association's creation may have already been exchanged before monitoring of the network commences.

The foregoing has outlined rather broadly certain features and technical advantages of the present invention so that the detailed description that follows may be better understood. Additional features and advantages are described hereinafter. As a person of ordinary skill in the art will readily recognize in light of this disclosure, specific embodiments disclosed herein may be utilized as a basis for modifying or designing other structures for carrying out the same purposes of the present invention. Such equivalent constructions do not depart from the spirit and scope of the invention as set forth in the appended claims. Several inventive features described herein will be better understood from the following description when considered in connection with the accompanying figures. It is to be expressly understood, however, the figures are provided for the purpose of illustration and description only, and are not intended to limit the present invention.

BRIEF DESCRIPTION OF THE DRAWINGS

For a more complete understanding of the present invention, reference is now made to the following drawings, in which.

DETAILED DESCRIPTION OF THE INVENTION

In the following description, reference is made to the accompanying drawings which illustrate embodiments of the invention. These embodiments are described in sufficient detail to enable a person of ordinary skill in the art to practice the invention, and it is to be understood that other embodiments may be utilized, and that changes may be made, without departing from the spirit of the present invention. The following description is, therefore, not to be taken in a limited sense, and the scope of the present invention is defined only by the appended claims.

Figure 1:
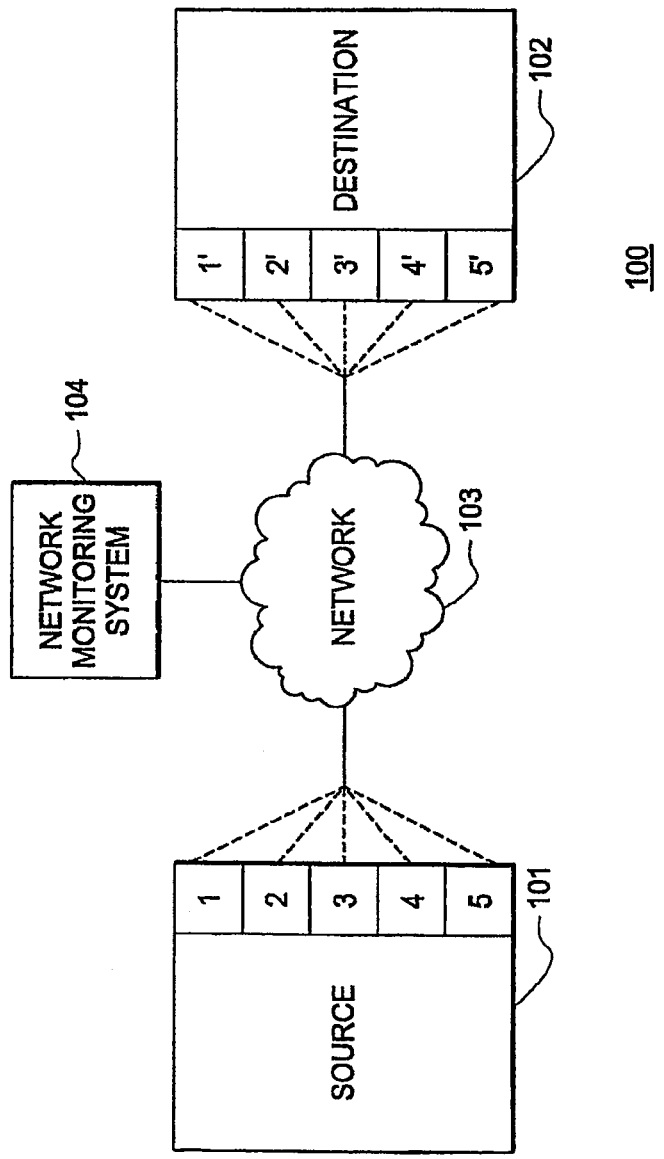
FIG. 1 is a block diagram of a network system according to an embodiment of the present invention.

Turning to FIG. 1, a block diagram of network system 100 is depicted according to one embodiment of the present invention. Source device 101 exchanges messages or communicates with destination device 102 via network 103. As such, devices 101 and 102 form two end-points of a communication link, also referred to as an association. In this illustrative example, device 101 has five IP addresses 1-5 and device 102 also has 5 IP addresses 1'-5' available for the communication. However, as a person of ordinary skill in the art will readily recognize in light of this disclosure, devices 101 and 102 may have any number of allocable or possible IP addresses. Network monitoring system 104 is connected to network 103, and is operable to monitor packets exchanged between devices 101 and 102. The terms "packet/" "message," and "chunk," will be used interchangeably hereinafter.

Typically, network monitoring system 104 monitors network 103 for slow or failing systems and notifies a network administrator in case of outages, problems due to overloaded or crashed servers, network connections, or the like. To that end, network monitoring system 104 analyzes packets or messages being communicated between devices 101 and 102. Commonly measured metrics are response time, availability (i.e., uptime), consistency, and reliability, among others. In one embodiment, network monitoring system 104 may be the Spectra2|SE™, a Voice-over-IP (VoIP) monitoring and testing product that runs on any computer configured with a Network Interface Card, available from Tektronix, Inc.

In order for network monitoring system 104 to identify traffic and correlate it back to its proper association, traffic is analyzed based on certain criteria so that a given packet may be accurately attributed to its association. Typically, a combination of source IP address, source port number, destination IP address, and destination port number is used to uniquely define an association. However, certain protocols make use of multihoming features that allow one or more IP addresses and/or port numbers to change during the communication between the same association of devices.

One such protocol that presently supports multihoming is SCTP. According to its specification, SCTP packets have a common header consisting of 12 bytes. For the identification of an association, SCTP uses the same port concept as Transmission Control Protocol (TCP) and User Datagram Protocol (UDP). And, for the detection of transmission errors, each SCTP packet is protected by a 32 bit checksum. Importantly, the common header also contains a 32-bit value called a verification tag. The verification tag is association specific and is exchanged between endpoints 101 and 102 at association startup. As such, two verification tag values are used in each association.

Accordingly, certain embodiments of the present invention resolve source and destination verification tags and use at least one of these tags to determine whether a subsequently monitored packet belongs to the association after the IP address and/or port number previously used during the communication has changed. Therefore, network monitoring system 104 may implement methods described below to sort packets according to their association. For example, network monitoring system 104 may monitor an exchange of messages among a plurality of source and destination devices, identify an association between a source device and a destination device by resolving a first combination of source and destination parameters that defines the association, and resolve a second combination of source and destination parameters that also defines the association. Thereafter, network monitoring system 104 may ascertain whether a subsequent message belongs to the association based upon the second combination of source and destination parameters, even when a parameter of the first combination has changed during communication.

For sake of conciseness, Table I defines abbreviations of terms used throughout this disclosure:

TABLE I

Abbreviations of Terms

| Abbreviation | Term |
| --- | --- |
| dstIP | Destination IP address |
| srcIP | Source IP address |
| dstPort | Destination IP Port |
| srcPort | Source IP Port |
| dstVTag | Destination Verification Tag |
| srcVTag | Source Verification Tag |

Generally, until network monitoring system 104 detects a [(srcIP, srcPort), (dstIP, dstPort)] match, it cannot determine with certainty that a packet belongs to the association. However, the combination of [(srcIP, srcPort), (dstIP, dstPort)] defines an association. Thus, after network monitoring system 104 has detected an [(srcIP, srcPort), (dstIP, dstPort)] match, it can resolve the VTags and use them in combination with port numbers for different IP addresses. In other words, the (srcVTag, dstVTag) of an SCTP association in a multihoming environment, where initialization messages, such as INIT and INIT_ACK, occurred at a prior time, can be resolved through analysis of data traffic where: Transmit [(srcIP, srcPort), (dstIP, dstPort)]=Receive [(dstIP, dstPort), (srcIP srcPort)].

By parsing through current incoming traffic, network monitoring system 104 can identify (srcVTag, dstVTag) of an SCTP association. In some embodiments, the incoming traffic is examined only once, thereby eliminating the need to go through the incoming traffic recursively. Further, if SCTP traffic is sorted by (VTag, port), then all the traffic of an SCTP association can be found under one of two lists, either keyed by (srcVTag, srcPort) or by (dstVTag, dstPort). After the (srcVTag, dstVTag) of an association has been resolved, all traffic of the association, whether received before or after that moment, can have its (srcVTag, dstVTag) resolved by the [(srcPort), (dstVTag, dstPort)] criteria, without the need to examine all monitored or intercepted packets incoming again.

Once the (srcVTag, dstVTag) of an association is resolved, all the traffic of the association received afterwards with a different IP address may have their (srcVTag, dstVTag) resolved, for example, using one of the following secondary combinations of parameters: [(srcIP, srcPort), (dstVTag, dstPort)], [(srcVTag, srcPort), (dstVTag, dstPort)], and/or [(srcVTag, srcPort), (dstIP, dstPort)]. Further, the combination of [(srcPort), (dstVTag, dstPort)] may also properly identify an SCTP association, particularly in cases where traffic is irregular or does not comply with SCTP standards.

Figure 2:
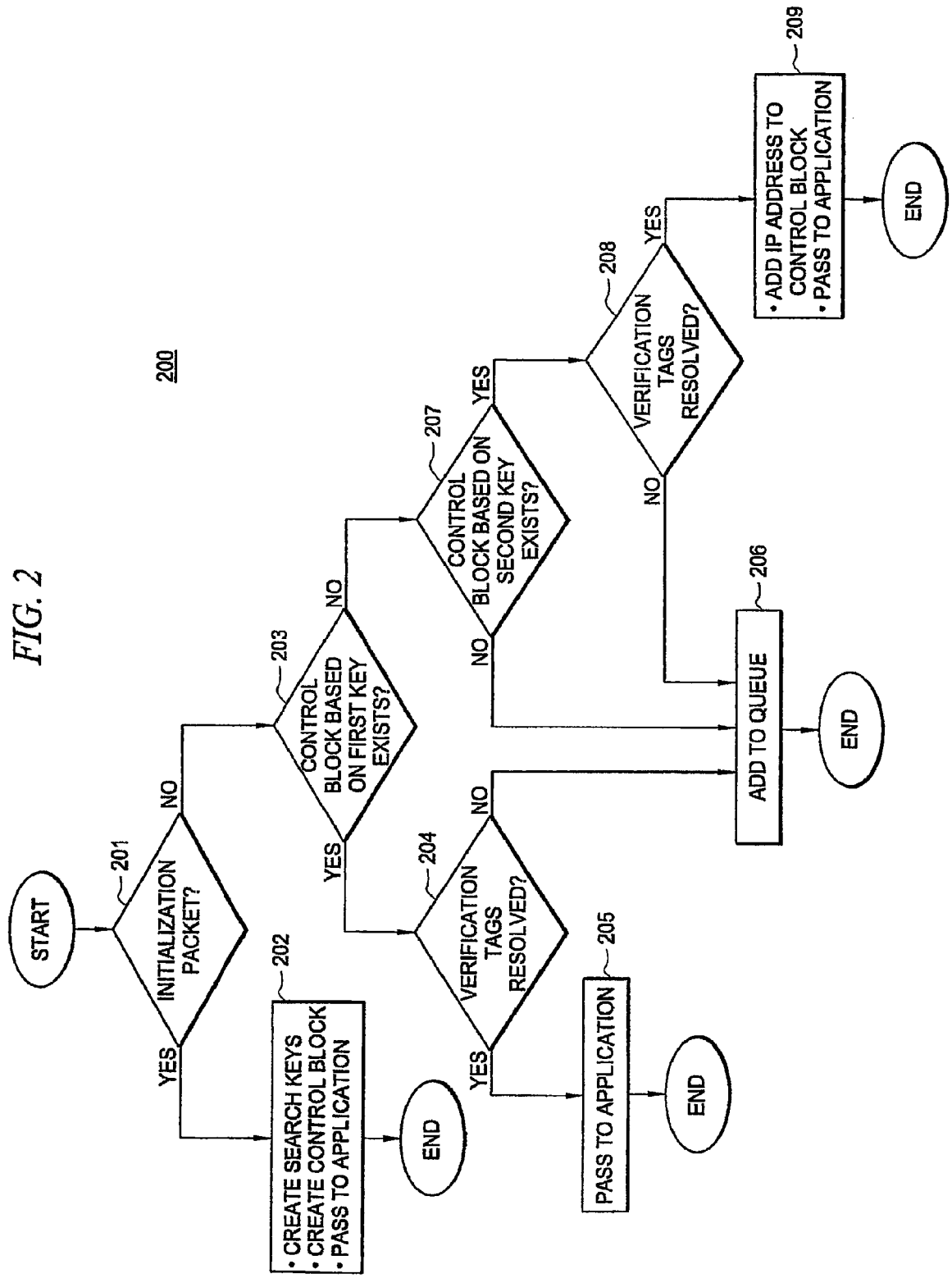
FIG. 2 is a flowchart of an initial packet processing method according to another embodiment of the present invention.
Figure 3:
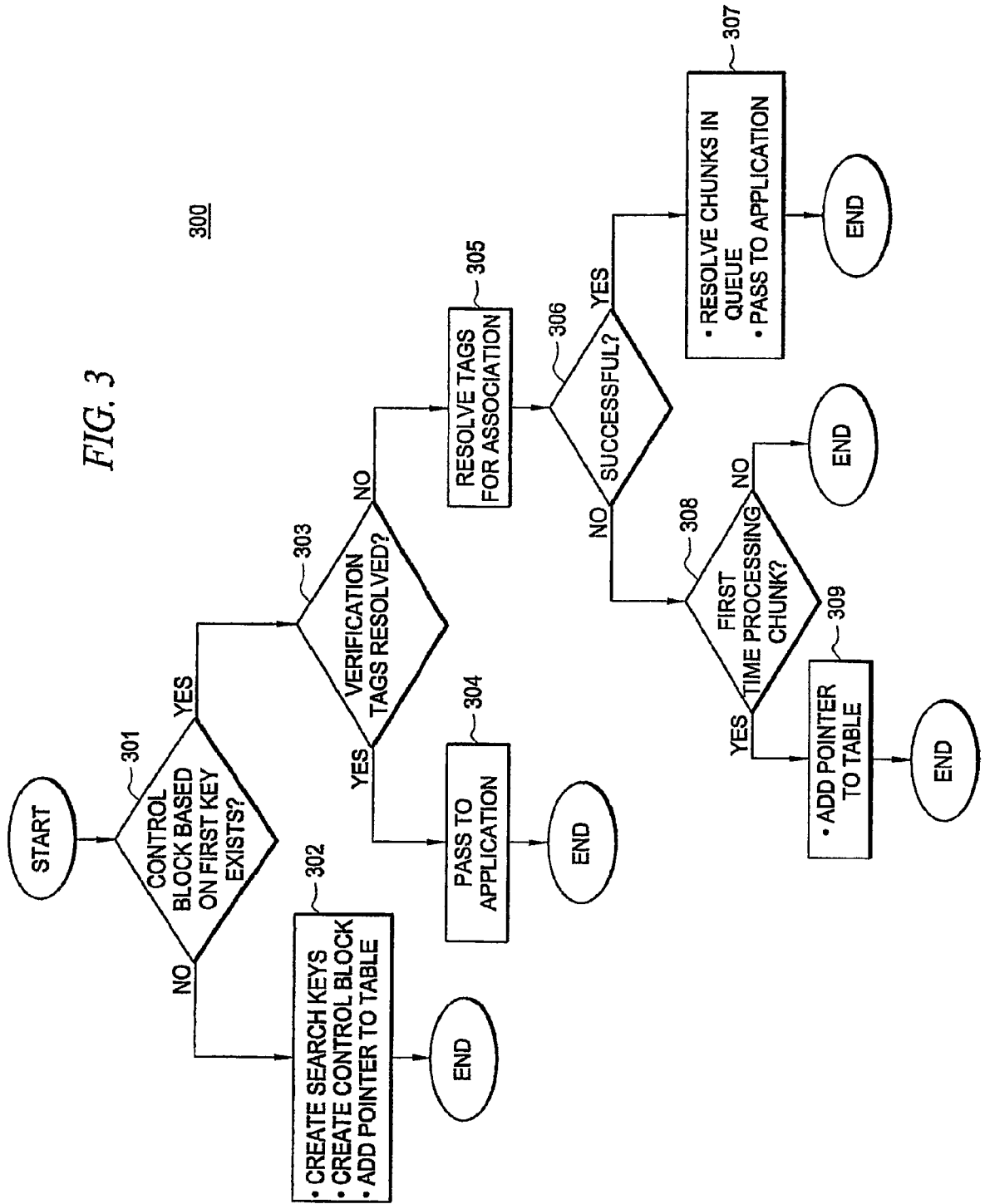
FIG. 3 is a flowchart of an association discovery method according to another embodiment of the present invention.

The foregoing has described, in general terms, certain embodiments of the present invention. FIGS. 2 and 3 discussed below depict implementations of these and other embodiments in sufficient detail to enable a person of ordinary skill the art to practice these aspects of the present invention. In connection with these discussions, Table II defines abbreviated names and definitions of exemplary data structures as follows:

TABLE II

Exemplary Data Structures

| Data Structure | Definition |
| --- | --- |
| SctpAssocCB | An SCTP Association Control Block data structure. |
| SctpAssocIpAddrPortHashTable | A hash table used to look up SctpAssocCB data structure. First search keys are [(srcIP, srcPort), (dstIP, dstPort)] and [(dstIP, dstPort), (srcIP, srcPort)]. |
| SctpAssocPortVTagPortHashTable | A hash table used to look up SctpAssocCB data structure. Second search keys are [(srcPort), (dstVTag, dstPort)] and [(dstPort), (srcVTag, srcPort)]. |
| SctpAssocDiscoverChunkQueue | A structure used to store all the received chunks for which (srcVTag, dstVTag) has not been resolved. |
| ChunkListByVTagPortHashTable | All received chunks (e.g., COOKIE ECHO, COOKIE ACK, DATA, SACK, HB, HB_ACK) whose (srcVTag, dstVTag) have not been resolved are sorted in the lists keyed by (dstVTag, dstPort) of the chunk. The chunk memory address (pointer) is stored in a list node. |

Turning now to FIG. 2, a flowchart illustrating initial packet processing method 200 is depicted according to one embodiment of the present invention. Step 201 determines if the intercepted packet is an initialization packet (INIT or INIT_ACK). If so, step 202 creates an SctpAssocCB. In addition, step 202 creates search keys [(srcIP, srcPort), (dstIP, dstPort)], [(dstIP, dstPort), (srcIP, srcPort)], [(srcPort), (dstVTag, dstPort)], [(dstPort), (srcVTag, srcPort)] for that SctpAssocCB. If a chunk other than an initialization packet is received, step 203 searches for an SctpAssocCB based on [(srcIP, srcPort), (dstIP, dstPort)] in SctpAssocIpAddrPortHashTable. If SctpAssocCB is found, step 204 checks to see whether the SctpAssocCB has its (srcVTag, dstVTag) resolved. If the combination of (srcVTag, dstVTag) is resolved, step 205 passes the chunk to the application layer. Otherwise, step 206 adds the chunk into SctpAssocDiscoverChunkQueue.

Referring back to step 203, if SctpAssocCB is not found, step 207 searches SctpAssocCB based on [(srcPort), (dstVTag, dstPort)] in SctpAssocPortVTagPortHashTable. If SctpAssocCB is found, step 208 checks whether the SctpAssocCB has its (srcVTag, dstVTag) resolved. If resolved, the chuck is passed to the application layer, the source or destination IP address is added to SctpAssocCB, and a search key is created based on the new srcIP or dstIP to the SctpAssocCB by step 209. If not, the chunk is added to SctpAssocDiscoverChunkQueue in step 206. However, if SctpAssocCB is not found in step 207, method 200 deletes the chunk if the association is not being monitored. If the association is being monitored, the chunk is added to SctpAssocDiscoverChunkQueue.

In one embodiment, if a discovery timer (DiscoveryProcTimer) has not yet started, method 200 may also start such timer, which then drives the discovery process. For instance, when DiscoveryProcTimer expires (e.g., 20 ms), all of the chunks in SctpAssocDiscoverChunkQueue are subject to an association discovery process such as the one depicted in FIG. 3.

FIG. 3 is a flowchart illustrating association discovery method 300 according to an embodiment of the present invention. For all the chunks in queued in SctpAssocDiscoverChunkQueue, method 300 may perform the following operations. First, step 301 searches SctpAssocCB based on [(srcIP, srcPort), (dstIP, dstPort)] in SctpAssocIpAddrPortHashTable. If SctpAssocCB is not found, the received SCTP chunk indicates a possible new SCTP association, then step 302 creates an SctpAssocCB with the information carried by the chunk, marks a flag Chunk.IsCreatedSctpAssocCB=True, and creates search keys [(srcIP, srcPort), (dstIP, dstPort)], and [(srcIP, srcPort), (dstIP, dstPort)] to the SctpAssocCB in SctpAssocIpAddrPortHashTable. If SctpAssocCB is found, step 303 determines whether the SctpAssocCB has its (srcVTag, dstVTag) resolved.

If the combination of (srcVTag, dstVTag) of the SctpAssocCB is resolved, step 304 sets a flag IsAssocDiscovered to true, passes the chunk to the application (e.g., EL monitoring application), and continues processing the next chunk in the discovery queue. However, if the (srcVTag, dstVTag) of the SctpAssocCB not resolved, then step 305 attempts to resolve this combination. For example, step 305 may assign its (dstVTag) to the dstVTag of SctpAssocCB if (srcIP, srcPort) of the chunk matches (srcIPAddrList, srcPort) of SctpAssocCB, or assign its (dstVTag) to srcVTag of SctpAssocCB if (srcIP, srcPort) of the chunk matches (dstDPAddrLst, dstPort) of SctpAssocCB. If step 306 determines that step 305 has been successful in resolving the srcVTag, dstVTag) of the SctpAssocCB, then step 307 resolves all the traffic of the association pointed by lists keyed by [srcVTag, srcPort] or [dstVTag, dstPort]. Any resolved chunks are then disassociated from the list of ChunkListByVTagPortHashTable and passed on to the application layer. Further, if a chunk has its IsCreatedSctpAssocCB flag set to true, then method 300 adds the IP address of the chunk into the resolved SctpAssocCB, creates search key based on newly added IP address, and deletes the SctpAssocCB created by the chunk. Finally, step 300 may also create search record keyed by [(srcPort), (dstVTag, dstPort)] and keyed by [(dstPort), (srcVTag, srcPort)] for the association.

Referring back to step 306, if the attempted resolution of (srcVTag, dstVTag) has been unsuccessful and it is the first time that this chunk is being processed, a pointer is added to a list using (dstVTag, dstPort) in ChunkListByVTagPortHashTable. As previously noted, all chunks in the discovery queue are processed in a similar manner. After discovery process terminates, all the chunks with flags IsAssocDiscovered set to true are removed from the discovery queue and passed to the application layer. As an option, any received message that cannot be resolved within a purge timer interval may be purged.

Figure 4A:
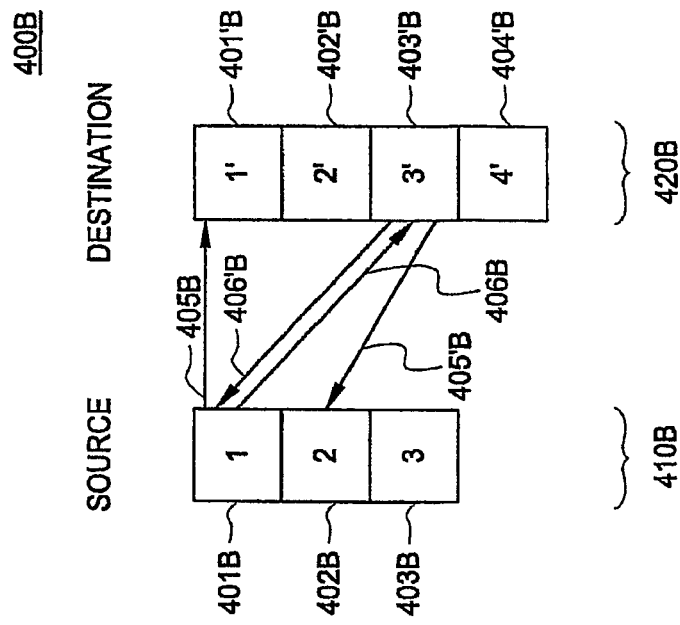
FIGS. 4A and 4B are block diagrams of communication patterns according to yet another embodiments of the present invention.
Figure 4B:
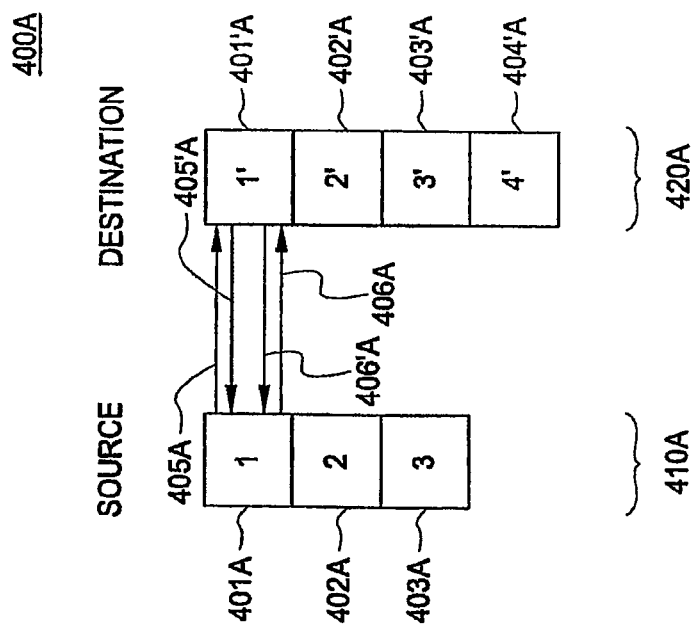

To better illustrate the operation of initial packet processing method 200 of FIG. 2 and association discovery method 300 of FIG. 3, FIGS. 4A and 4B provide exemplary communication patterns processed according to methods 200 and 300.

Turning now to FIG. 4A, packets are exchanged and processed as follows. First, packet 405A is transmitted from source 410A using IP address 401A to IP address 401'A of destination 420A. Initial packet processing method 200 determines that packet 405A is not a initialization or initialization acknowledgement packet in step 201. Then, step 203 determines whether a control block for the association exists based on a first key [(SrcDP, srcPort), (DstIP, dstPort)]. Because 405A is the first packet monitored between source 410A and destination 420A, the control block does not exist at this point. Accordingly, step 207 determines whether a control block for this association exists based on a second key [srcPort, (dstVTag, dstPort)]. Again, because this is the first packet in the exchange, the control block does not yet exist and the chunk is added to the discovery queue in step 206.

Then, packet 405'A is transmitted from source 420A using IP address 401'A to IP address 401A of destination 410A. The initial processing is the similar to that of packet 405 A, and causes packet 405'A to be placed in the discovery queue in step 206.

When discovery method 300 is begins (e.g., 20 ms after receipt of packets 405A and/or 405'A), packet 405A is processed first because it is first in the discovery queue. Step 301 determines whether a control block for the association exists based on the first key [(SrcIP, srcPort), (DstIP, dstPort)]. Because there is no such control block, this indicates a possible new SCTP association. Thus, step 302 creates search keys, creates a control block, and adds a pointer to IpAddrPortHashTable directed to the location of packet 405 A in the discovery queue. When packet 405'A is processed, step 301 determines that a control block based on the first key [(SrcIP, srcPort), (DstIP, dstPort)] exists. However, step 303 determines that verification tags for the association have not yet been resolved (i.e., there is only one-sided VTag information because only packet 405A has been processed by discovery method 300 at this point). Then, step 305 attempts to resolve the VTags for the association and control passes to step 306. If the attempt is successful, method 300 adds the VTag to the control block, identifies all chunks belonging to the association that are in the discovery queue (i.e., 405A and 405'A) by flagging each of them as belonging to the association, and passes them to the application layer.

After the association has been resolved as described above, all packets belonging to that association can be identified using the control block, and thus they need not be added to the discovery queue. For example, when packet 406'A is transmitted from destination 420A to source 410A, step 203 of method 200 determines that a control block already exists for the association. Further, step 204 determines that the VTags for the association have also been resolved. Therefore, step 205 marks packet 406A as belonging to the association and passes it to the application layer. The same analysis holds true for packet 406A transmitted from source 410A destination 420A.

Turning now to FIG. 4B, packets are exchanged and processed as follows. First, packet 405B is transmitted from source 410B using IP address 40IB to IP address 401'B of destination 420'B. Similarly as the situation described above with respect to packet 405A of FIG. 4A, packet 405B is initially stored in the discovery queue under control of step 206 of initial packet processing method 200. Likewise, packet 405'B is transmitted from destination 420B using IP address 403'B to DP address 402B of source 410B, and its is also placed in the discovery queue. When discovery method 300 begins for packet 405B, step 301 does not find a control block for this association, thus step 302 processes packet 405B to create search keys, create a control block, and add a pointer to IpAddrPortHashTable directed to the location of packet 405B in the discovery queue. Similarly, step 301 does not find a control block for packet 405'B, and step 302 processes packet 405'B to create search keys, create a control block, and add a pointer to IpAddrPortHashTable directed to the location of packet 405'B in the discovery queue.

When packet 406B is transmitted from IP address 401B of source 410B to IP address 403'B of destination 420B, step 203 of initial processing method 200 determines that a control block for the association does not exist based upon the first key [(SrcEP, srcPort), (DsUP, dstPort)]. Step 207 determines that a control block for the association exists based upon the second key [(srcPort), (DstVTag, dstPort)], which is the one created by packet 405B. However, the VTags for this association have not yet been resolved in step 208, thus packet 406B is also added to the queue in step 206. Under control of discovery method 300, step 301 determines that a control block does-not exist for packet 406B. Therefore, step 302 creates search keys, creates a control block, and adds a pointer to IpAddrPortHashTable directed to the location of packet 406B in the discovery queue.

Finally, when packet 406'B is transmitted from IP address 403'B of destination 420B to IP address 401B of source 410B, initial processing method 200 adds a packet 406'B to the discovery queue. However, when method 300 operates upon packet 406'B, step 301 determines that a control block exists based on the first key [(SrcIP, srcPort), (DstIP, dstPort)]. At this point, the VTags of the association cannot yet be determined in step 303, therefore step 305 attempts to resolve the VTags for the association. If the attempt is successful as determined in step 306, step 307 resolves all chunks in the queue that belong to the association (405B, 405'B, 406B, and 406'B) and passes them to the Application layer in order.

As a person of ordinary skill in the art will readily recognize in light of this disclosure, certain embodiments of the present invention are applicable to the monitoring of network communications making use of the SCTP protocol. Other embodiments of present invention may be used in connection with any protocol having multihoming features. Further, any standard or proprietary protocol now existing or yet to be developed may be readily incorporated into the embodiments of the present invention described herein.

The methods and processes described above may be implemented in software. Software may comprise computer executable instructions stored on computer readable media such as memory or other type of storage devices. Further, functions may correspond to modules, which may be software, hardware, firmware or any combination thereof. Multiple functions may be performed in one or more modules as desired, and the embodiments described are merely examples. Software may be executed on a digital signal processor, ASIC, microprocessor, or other type of processor operating on a computer system, such as a personal computer, server or any other computer system.

The software, computer program logic, or code segments implementing various embodiments of the present invention may be stored in a computer readable medium of a computer program product. The term "computer readable medium" includes any medium that can store or transfer information. Examples of the computer program products include an electronic circuit, a semiconductor memory device, a ROM, a flash memory, an erasable ROM (EROM), a floppy diskette, a compact disk CD-ROM, an optical disk, a hard disk, and the like. Code segments may be downloaded via computer networks such as the Internet or the like.

Figure 5:
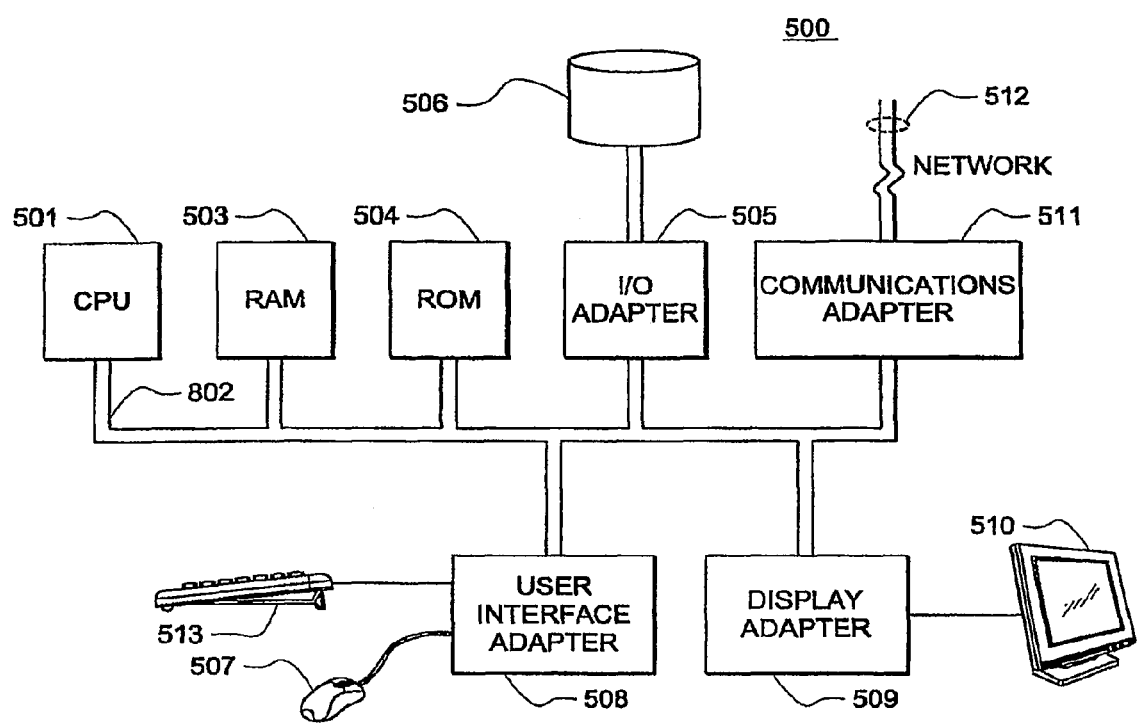
FIG. 5 is a block diagram of a computer implementing certain embodiments of the present invention.

FIG. 5 illustrates network monitoring system or computer 500 adapted to use embodiments of the present invention (e.g., storing and/or executing software associated with the embodiments). In one embodiment, network monitoring system or computer 500 contains software that causes it to execute steps of methods 200 and 300 of FIGS. 2 and 3, respectively. In this embodiment, computer system 500 may function as network monitoring system 104 depicted in FIG. 1.

Central processing unit ("CPU") 501 is coupled to system bus 502. CPU 501 may be any general purpose CPU. However, embodiments of the present invention are not restricted by the architecture of CPU 501 as long as CPU 501 supports the inventive operations as described herein. Bus 502 is coupled to random access memory ("RAM") 503, which may be SRAM, DRAM, or SDRAM. ROM 504 is also coupled to bus 502, which may be PROM, EPROM, or EEPROM.

Bus 502 is also coupled to input/output ("I/O") controller card 505, communications adapter card 511, user interface card 508, and display card 509. I/O adapter card 505 connects storage devices 506, such as one or more of a hard drive, a CD drive, a floppy disk drive, a tape drive, to computer system 500. I/O adapter 505 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 511 is adapted to couple the computer system 500 to network 512, which maybe one or more of a telephone network, a local ("LAN") and/or a wide-area ("WAN") network, an Ethernet network, and/or the Internet. For example, network 512 may be the same as network 103 of FIG. 1. User interface card 508 couples user input devices, such as keyboard 513, pointing device 507, and the like, to computer system 500. Display card 509 is driven by CPU 501 to control the display on display device 510.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods, and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods, or steps.

We claim:

1. A method comprising:
monitoring, by a network monitoring system, packets communicated among a plurality of source and destination devices in a network using a protocol that supports multihoming, wherein said network monitoring system is independent of said source and destination devices;
determining from the monitored packets, by the network monitoring system, a first combination of source IP address, source port number, destination IP address, and destination port number that defines a first association between a source device and a destination device; and
resolving, by the network monitoring system, a first combination of source and destination verification tags that further defines the first association based upon the first combination of IP addresses and port numbers wherein said resolving is performed by the network monitoring system without use of packets exchanged between the source and destination devices for setting up a multihoming association.

2. The method of claim 1, further comprising ascertaining, by the network monitoring system, whether a subsequently monitored packet belongs to the first association based at least in part upon an element of the first combination of source and destination verification tags.

3. The method of claim 2, where the ascertaining step occurs after at least one element of the first combination of source IP address, source port number, destination IP address, and destination port number has changed during a communication.

4. The method of claim 2, further comprising passing the subsequently monitored packet to an application if the packet belongs to the first association.

5. The method of claim 2, further comprising ascertaining whether the subsequently monitored packet belongs to the first association based upon a combination of source IP address, source port number, destination verification tag, and destination port number.

6. The method of claim 2, further comprising ascertaining whether the subsequently monitored packet belongs to the first association based upon a combination of source verification tag, source port number, destination verification tag, and destination port number.

7. The method of claim 2, further comprising ascertaining whether the subsequently monitored packet belongs to the first association based upon a combination of source port number, destination verification tag, and destination port number.

8. The method of claim 2, further comprising updating the first combination of source IP address, source port number, destination IP address, and destination port number that defines the association based upon the first combination of source and destination verification tags after at least one element of the first combination of source IP address, source port number, destination IP address, and destination port number has changed during a communication.

9. The method of claim 1, where the protocol is a Stream Control Transmission Protocol.

10. The method of claim 1, further comprising:
determining, by the network monitoring system, a second combination of source IP address, source port number, destination IP address, and destination port number that defines a second association between another source device and another destination device; and
resolving, by the network monitoring system, a second combination of source and destination verification tags that further defines the second association based upon the second combination of IP addresses and port numbers.

11. The method of claim 1 wherein said network monitoring system comprises a processor-based device.

12. The method of claim 1 wherein said monitoring commences after packets creating the association have been exchanged.

13. The method of claim 1 wherein a first set of values for said first combination of source IP address, source port number, destination IP address, and destination port number defines said first association between the source device and the destination device for communication with each other during a communication session; and wherein said resolving comprises:
resolving said combination of source and destination verification tags that further defines the first association, wherein said resolved combination of source and destination verification tags enables identification of monitored packets as belonging to the first association even when one or more of the first set of values has changed during the communication session.

14. The method of claim 13 further comprising:
ascertaining by the network monitoring system, based at least in part on at least one of the resolved source and destination verification tags, whether monitored packets belong to the first association after one or more of the first set of values has changed during the communication session.

15. A method comprising:
monitoring, by a processor-based device, an exchange of messages among a plurality of source and destination devices, wherein said processor-based device is independent of said source and destination devices;
identifying, by said processor-based device, based upon the monitoring step, an association between a source device and a destination device by resolving a first combination of source and destination parameters that defines the association; and
resolving, by said processor-based device, based upon the identification step, a second combination of source and destination parameters that also defines the association wherein said resolving is performed by the network monitoring system without use of packets exchanged between the source and destination devices for setting up a multi-homing association.

16. The method of claim 15, further comprising:
ascertaining, by said processor-based device, whether a subsequent message belongs to the association based upon the second combination of source and destination parameters; and
transmitting the subsequent message of the subsequent message to an application if the message belongs to the association.

17. The method of claim 16, where the ascertaining step occurs after one or more parameters of the first combination of source and destination parameters has changed during a communication.

18. The method of claim 16, further comprising updating the first combination of source and destination parameters.

19. The method of claim 15 wherein a first set of values for said first combination of source and destination parameters defines said association between the source device and the destination device for communication with each other during a communication session; and
wherein said resolving comprises:
resolving said second combination of source and destination parameters that further defines the association, wherein said resolved second combination enables identification of monitored packets as belonging to the association even when one or more of the first set of values has changed during the communication session.

20. The method of claim 19 wherein said first combination of source and destination parameters comprises source IP address, source port number, destination IP address, and destination port number; and wherein said resolved second combination of source and destination parameters comprises at least one of source verification tag and destination verification tag.

21. The method of claim 19 further comprising:
ascertaining by the network monitoring system, based at least in part on the resolved second combination of source and destination parameters, whether monitored packets belong to the association after one or more of the first set of values has changed during the communication session.

22. A network monitoring system having computer program logic stored to non-transitory computer-readable medium that, when executed by the system, causes the system to perform the steps of:
monitoring packets communicated among a plurality of source and destination devices in a network using a protocol that supports multihoming, wherein said monitoring occurs at a point disposed in said network that is external to said source and destination devices and communicatively between said source and destination devices;
determining a combination of source IP address, source port number, destination IP address, and destination port number that defines an association between a source device and a destination device; and
resolving a combination of source and destination verification tags that further defines the association based upon the combination of IP addresses and port numbers wherein said resolving is performed by the network monitoring system without use of packets exchanged between the source and destination devices for setting up a multi-homing association.

23. The network monitoring system of claim 22, where the computer program logic further causes a computer to perform the step of ascertaining whether a subsequently monitored packet belongs to the association based at least in part upon an element of the combination of source and destination verification tags.

24. The network monitoring system of claim 23, where the ascertaining step occurs after at least one element of the combination of source IP address, source port number, destination IP address, and destination port number has changed during a communication.

25. The network monitoring system of claim 23, where the computer program logic further causes a computer to perform the step of passing the subsequently monitored packet to an application if the packet belongs to the association.

26. The network monitoring system of claim 22 wherein a first set of values for said first combination of source IP address, source port number, destination IP address, and destination port number defines said association between the source device and the destination device for communication with each other during a communication session; and wherein said resolved combination of source and destination verification tags enables identification of monitored packets as belonging to the association even when one or more of the first set of values has changed during the communication session.

27. The network monitoring system of claim 26, where the computer program logic further causes a computer to perform the step of:
ascertaining, based at least in part on at least one of the resolved source and destination verification tags, whether monitored packets belong to the association after one or more of the first set of values has changed during the communication session.

* * * * *